Figure 1:
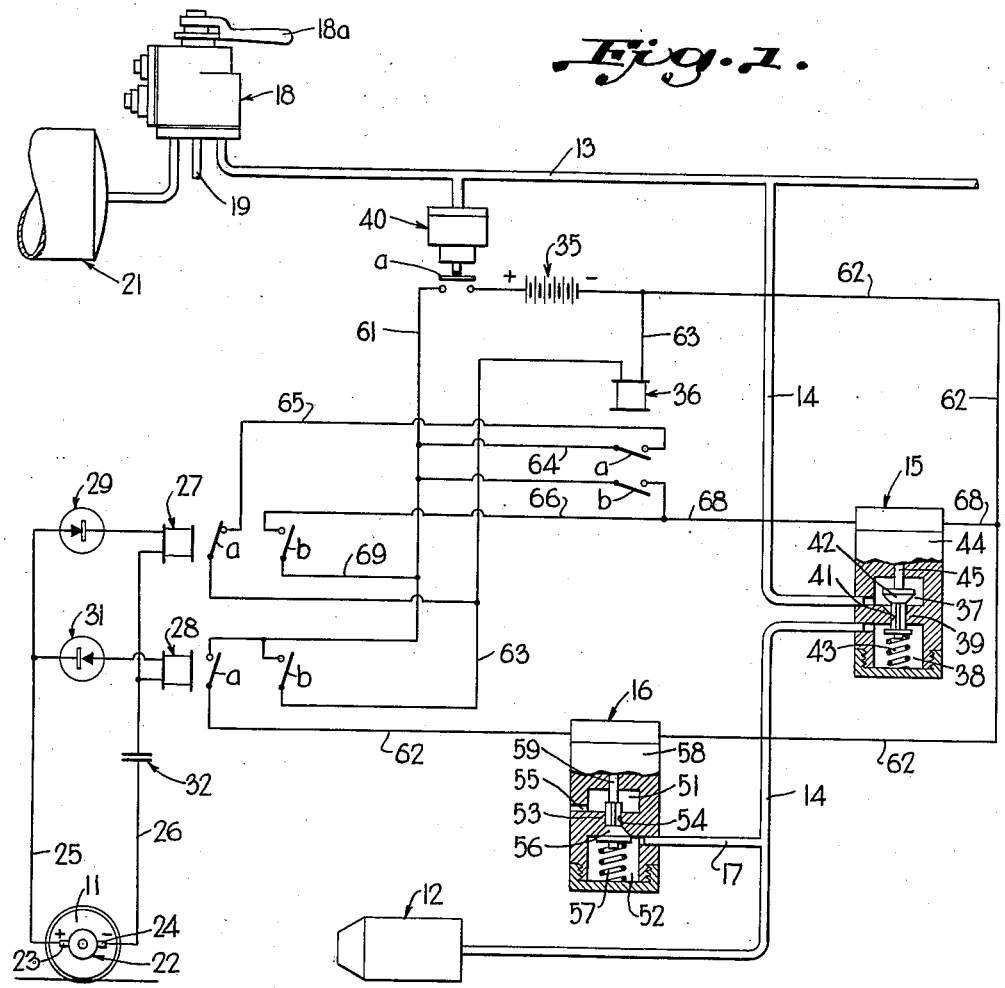

Sept. 16, 1941.      J. C. McCUNE      2,256,287
BRAKE CONTROL MEANS
Filed April 30, 1940

INVENTOR
JOSEPH C. McCUNE
BY A. M. Higgins
ATTORNEY

Patented Sept. 16, 1941

2,256,287

UNITED STATES PATENT OFFICE 2,256,287

BRAKE CONTROL MEANS

Joseph C. McCune, Edgewood, Pa., assignor to The Westinghouse Air Brake Company, Wilmerding, Pa., a corporation of Pennsylvania Application April 30, 1940, Serial No. 332,435

6 Claims. (Cl. 303—21)

This invention relates to brake control means and has particular relation to vehicle wheel brake control means adapted to operate automatically in response to the slipping of a vehicle wheel, caused by excessive application of the brakes, to effect a rapid release of the brakes so as to cause the wheels to cease to decelerate and then to accelerate back toward a speed corresponding to vehicle speed without attaining a locked or non-rotative condition and sliding.

As is well known, if the degree of application of the brakes associated with a vehicle wheel exceeds the adhesion or rolling friction between the wheel and the road surface or rail, the wheel decelerates at an abnormally rapid rate to a locked or non-rotative condition and slides. As employed herein, the terms "slip" and "slide" are not synonymous but refer respectively to the rotation of a vehicle wheel at a speed less than the speed corresponding to the vehicle speed at a given instant and to the dragging of the vehicle wheel in a locked or non-rotative condition. The distinction between these two terms should be kept in mind in the subsequent description of my invention.

With a favorable or high adhesion condition, a vehicle wheel may be braked so as to decelerate at rates up to about five miles per hour per second without slipping. In no case can a vehicle wheel be decelerated at a rate exceeding a certain value, such as a rate corresponding to ten miles per hour per second rate, unless the wheel is slipping. Various devices of a mechanical or an electrical nature have accordingly been proposed, which devices are responsive to the rotative deceleration of a vehicle wheel at a rate exceeding a certain rate, such as ten miles per hour per second, which occurs only when the wheel slips for automatically causing a rapid reduction in the degree of application of the brakes so as to cause the wheels to cease to decelerate and begin to accelerate back toward a speed corresponding to vehicle speed before the slipping wheel can be reduced in speed to a locked or non-rotative condition and slide.

If the reapplication of the brakes on a slipping wheel is initiated at the instant of cessation of deceleration of a vehicle wheel at a slipping rate, it will be apparent that due to the fact that the wheel is instantaneously rotating at a speed approaching the nadir or lowest speed of the speed curve during the slipping cycle, the reapplication of the brakes to an appreciable degree at such time may readily cause the wheel to immediately decelerate to a locked or non-rotative condition and slide.

Various types of control apparatus have accordingly been proposed for delaying or preventing the reapplication of the brakes on a slipping wheel until such time as the slipping wheel is accelerating back toward a speed corresponding to the vehicle speed at the rate exceeding a certain rate or until the slipping wheel is fully restored to a speed corresponding to vehicle speed, in order to obviate the possibility of locking the wheel due to premature reapplication of the brakes.

It is a general object of my invention to provide novel electrical apparatus for controlling the release and the reapplication of the brakes on a slipping wheel in a manner to prevent the sliding of the wheels.

More particularly, it is an object of my invention to provide apparatus of the type mentioned in the foregoing object and characterized by a novel arrangement for preventing the reapplication of the brakes on a slipping wheel until the wheel returns substantially to a speed corresponding to vehicle speed.

It is a further object of my invention to provide an apparatus of the type mentioned in the foregoing object in which the reapplication of the brakes on a slipping wheel is prevented until the rate of acceleration of the slipping wheel as it returns back toward a speed corresponding to vehicle speed, reduces below a certain low rate.

The above objects, and other objects of my invention which will be made apparent hereinafter, are attained by means of a simplified embodiment of my invention shown in Fig. 1 of the accompanying drawings and in a modification thereof shown in Fig. 2.

Referring to Fig. 1 of the drawings, I have, for simplicity, illustrated my invention in connection with a single wheel unit 11 which may be a single wheel or a pair of wheels fixed to opposite ends of a connecting axle.

The brakes associated with the wheel unit 11 may be of any suitable type, such as the clasp shoe type, which are operated by means of a fluid pressure operated device illustrated as a conventional brake cylinder 12. Any suitable arrangement under the control of the operator of the vehicle may be provided for supplying fluid under pressure to the brake cylinder 12 to effect application of the brakes and releasing fluid under pressure from the brake cylinder 12 to effect the release of the brakes. For simplicity, I have illustrated a pipe 13, hereinafter designated the control pipe, to which the brake cylinder 12 is connected by a branch pipe 14. Communication through the branch pipe 14 from the control pipe 13 to the brake cylinder 12 is under the control of a normally open cut-off magnet valve 15. Also associated with the branch pipe 14 is a normally closed release or vent magnet valve 16 which is operative to vent fluid under pressure from the brake cylinder 12 and which is connected to the branch pipe 14 at a point between the brake cylinder 12 and the cut-off magnet valve 15 by a branch pipe 17.

It will accordingly be understood that when the pressure in the control pipe 13 is at a predetermined low pressure or atmospheric pressure, a corresponding fluid pressure is established in the brake cylinder and the brakes are released. Conversely, as the pressure of the fluid established in the control pipe 13 increases, the pressure in the brake cylinder 12 correspondingly increases to correspondingly increase the degree of application of the brakes.

Any desired apparatus may be provided for controlling the pressure of the fluid in the control pipe 13. For simplicity, I have illustrated a self-lapping type of brake valve 18 of well-known construction having an operating handle 18a.

When the brake valve handle 18a is in the normal release position, the self-lapping mechanism of the brake valve operates to release fluid under pressure from control pipe 13 to atmosphere through the exhaust port 19 of the brake valve. As the brake valve handle 18a is shifted in a horizontal plane out of its normal release position into a so-called application zone, the self-lapping mechanism of the brake valve operates to supply fluid under pressure from a reservoir 21, hereinafter referred to as the main reservoir, to the control pipe 13, the pressure established in the pipe 13 corresponding substantially to the degree of displacement of the brake valve handle 18a out of its normal position.

The brake valve 18 has a pressure maintaining function, that is, it operates automatically to maintain a pressure in the control pipe 13 corresponding to the position of the brake valve handle. Thus, if for some reason the pressure in the pipe 13 tends to reduce below a pressure corresponding to the position of the brake valve handle 18a, the self-lapping valve mechanism of the brake valve 18 automatically operates to supply fluid under pressure to the control pipe to maintain such pressure. The reason for this pressure-maintaining feature will be made apparent hereinafter.

In accordance with my invention, a magneto or generator 22 of the direct-current type is provided for each wheel unit 11 of a car or train and is driven thereby so as to provide a voltage across the brush terminals 23 and 24 thereof which is substantially proportional to the rotative speed of the wheel unit. Each generator 22 may be mounted in or on the journal at the end of the axle of a wheel unit, as diagrammatically shown, with the rotary armature shaft of the generator coaxially related and coupled to the axle of the wheel unit.

Connected to the brush terminals 23 and 24 of the generator 22 are two wires 25 and 26 respectively, across which are connected, in parallel relation, the operating windings of two relays 27 and 28. Interposed between one terminal of the operating winding of the relay 27 and the wire 25 is a uni-directional valve 29 of the electrical type, which may be a rectifier unit or other similar asymmetrical device. In a similar manner, a uni-directional valve 31 is interposed between the corresponding terminal of the operating winding of the relay 28 and the wire 25. Connected in the wire 26 between the brush terminal 24 and the relay 28 is an electrical condenser 32 of suitable microfarad capacity.

The relays 27 and 28 are conventional relays of the neutral type. Relay 27 has a back-contact member $a$ and a front-contact member $b$ which are respectively in closed and open positions when the operating winding of the relay is deenergized. The operating winding of relay 27 is so designed that when a current exceeding a certain value energizes the operating winding, the contact members $a$ and $b$ are respectively actuated to open and closed position. As is well understood by those skilled in the art, the contact members $a$ and $b$ are maintained picked-up by a smaller current than that required to initially pick-up the contact members. Accordingly, once the contact members $a$ and $b$ of the relay 27 are picked-up, they are not restored to the normal positions thereof, in which they are shown, until the current energizing the relay operating winding reduces to a relatively lower value.

Relay 28 is similar to relay 27 except that it has two front-contact members $a$ and $b$. When the current energizing the operating winding of the relay 28 exceeds a certain value, the contact members $a$ and $b$ are actuated to their picked-up or closed positions and not restored to their open positions until the energizing current reduces to a relatively lower value.

The arrangement of the uni-directional valves 29 and 31 is such that current is permitted to flow through the operating winding of the relay 27 only from the wire 25 to the wire 26 and through the operating winding of the relay 28 only from the wire 26 to the wire 25.

Let it be assumed that when the wheel unit 11 rotates in a direction corresponding to a forward direction of travel of the car, the brush terminal 23 of the generator 22 is of positive polarity while the brush terminal 24 is of negative polarity. It will thus be seen that upon acceleration of the car, the voltage across the brush terminals of the generator 22 increases with the speed of the car and at a corresponding rate. Current accordingly flows in the circuit from positive brush terminal 23 by way of the wire 25, uni-directional valve 29, winding of the relay 27 and wire 26 to one terminal of the condenser 32 while current also flows from the opposite terminal of the condenser 32 back to the negative brush terminal 24. As is well known, the condenser charging current in a circuit of the type described is proportional to the rate of increase of the generator voltage and thus to the rate of rotative acceleration of the wheel unit 11. It will be apparent that the voltage to which the condenser 32 is charged lags behind the increasing generator voltage an amount proportional to the rate of increase of generator voltage. Thus the condenser charging current in the circuit at any instant is in turn proportional to the instantaneous difference in potential across the generator brush terminals and the potential across the terminals of the condenser 32.

The winding of the relay 27 is so designed that for normal rates of acceleration of the car, as when starting or accelerating under power, the condenser charging current is insufficient to cause pick-up of the contact members *a* and *b* of the relay 27. If, however, the rate of acceleration of the wheel unit 11 exceeds a certain rate, such as ten miles per hour per second, which occurs only when the slipping wheel accelerates back toward a speed corresponding to car speed, the condenser charging current flowing through the winding of the relay 27 is then sufficient to cause pick-up of the contact members of the relay.

When the speed of rotation of the wheel unit 11 decreases, the voltage across the brush terminals 23 and 24 of the generator 22 decreases correspondingly and the condenser 32 accordingly discharges current in a reverse direction through the circuit. In this case, the flow of current is from the upper terminal of the condenser 32 by way of the wire 26, the operating winding of relay 28, unidirectional valve 31, wire 25 and through the armature winding of generator 22 to the opposite terminal of the condenser 32. The condenser discharge current is proportional to the rate of decrease of generator voltage and thus to the rate of rotative deceleration of the wheel unit 11. The operating winding of the relay 28 is so designed that unless the condenser discharge current flowing through the winding exceeds a certain value corresponding to a rate of rotative deceleration of the wheel of at least ten miles per hour per second, which occurs only when the wheel unit slips, the contact members of the relay are not picked-up.

Additional equipment includes a source of electrical energy, such as a storage battery 35, a relay 36, and a fluid pressure operated switch device 40 responsive to the pressure in the control pipe 13.

Relay 36 is a conventional relay of the neutral type having a suitable operating winding and two front-contact members *a* and *b*, each of which is biased to an open position when the relay winding is deenergized and each of which is actuated to a picked-up or a closed position when the operating winding of the relay is energized. The relays 27, 28 and 36 function to control energization and deenergization of the magnet windings of the cut-off magnet valve 15 and the release magnet valve 16 in the manner hereinafter to be fully described.

The pressure operated switch device 40 may be of any well-known type responsive to variations of fluid pressure supplied to a pressure chamber thereof. Briefly, the switch device 40 comprises a switch contact member *a* which is snapped to an open position out of engagement with a pair of associated contact members whenever the pressure in the control pipe 13 reduces below a certain low pressure, such as five pounds per square inch. Conversely, when the pressure in the control pipe 13 exceeds such certain pressure the switch contact member *a* is snapped to a closed position engaging the associated pair of contact members and held in such closed position until the operating fluid pressure reduces sufficiently to restore the switch contact member to its open position.

As will be made apparent hereinafter, pressure switch 40 is effective to interrupt all circuit connections to the battery 35, when the brakes are released, to prevent undesired energization of the windings of the relay 36 and the magnet valves 15 and 16.

Before proceeding to a description of the operation of the equipment, the magnet valves 15 and 16 which are conventional and well-known will be here briefly described.

Magnet valve 15 comprises a suitable casing having two chambers 37 and 38 separated by a wall 39 having a port 41 connecting the two chambers. One section of the branch pipe 14 connects the control pipe 13 to the chamber 37 and the other section of the pipe 14 connects the brake cylinder 12 to the chamber 38.

A valve 42 of the poppet type is contained in the chamber 37 and has a fluted stem which extends through the port 41 into the chamber 38. A coil spring 43, interposed between the casing and the end of the fluted stem of the valve 42, yieldingly urges the valve 42 to an unseated position with respect to a valve seat formed on the wall 39.

A suitable magnet winding 44, contained within the upper portion of the casing, is effective when energized to exert a magnetic force on a plunger 45 which in turn engages the valve 42 and shifts it downwardly to its seated position. When the magnet winding 44 is deenergized, the spring 43 unseats the valve 42.

It will be apparent that the valve 42, when unseated, establishes communication from the chamber 37 to the chamber 38 and thus opens communication through the branch pipe 14 from the control pipe 13 to the brake cylinder 12. When the valve 42 is seated, communication between the chambers 37 and 38 is closed and thus the communication between the control pipe 13 and the brake cylinder 12 is closed or cut-off.

The release magnet valve 16 comprises a casing having two chambers 51 and 52 separated by a wall 53 having a port 54 connecting the two chambers. Chamber 51 is constantly connected to atmosphere through a large-sized port 55. Chamber 52 is constantly connected to the pipe 14 by the branch pipe 17.

Contained in the chamber 52 is a valve 56 of the poppet type having a fluted stem extending through the port 54 into the chamber 51. A coil spring 57, interposed between the valve 56 and the casing, urges the valve 56 into seated relation on a valve seat formed on the wall 53. A magnet winding 58, contained in the upper portion of the casing, is effective when energized to exert a magnetic force on a plunger 59 urging it downwardly to unseat the valve 56.

It will be obvious that when the valve 56 is unseated, fluid under pressure is vented to atmosphere from the branch pipe 14 and the connected brake cylinder 12 by way of the exhaust port 55, and that when the valve 56 is seated, such exhaust is cut-off.

*Operation of equipment*

Let it be assumed that with the main reservoir 21 charged to the normal pressure carried therein, such as one hundred pounds per square inch, the car is traveling in a forward direction with the brake valve handle 18a in its normal or brake release position.

To effect an application of the brakes, the operator shifts the brake valve handle 18a into the application zone an amount corresponding to a desired degree of application of the brakes. The control pipe 13 is accordingly charged with fluid at a pressure, such as forty pounds per square inch, corresponding to the degree of displacement of the brake valve handle 18a out of its normal operating position.

The magnet winding of the cut-off magnet valve 15 and that of the release magnet valve 16 are deenergized at this time for reasons which will be made apparent hereinafter and, accordingly, the magnet valves 15 and 16 are respectively in open and closed positions, as shown.

With the control pipe 13 charged to a pressure, such as forty pounds per square inch, fluid under pressure flows from the control pipe to the brake cylinder 12 to build-up a corresponding pressure therein to effect application of the brakes to a corresponding degree and pressure switch 40 is actuated to its closed position. If the adhesion between the wheel unit 11 and the track rails is sufficiently high that no slipping of the wheel unit occurs in response to the application of the brakes as just described, no further operation of the equipment occurs except in response to a change in the position of the brake valve handle 18a either to increase or decrease the fluid pressure in the control pipe 13 and connected brake cylinder 12.

To effect a release of the brakes, the operator merely restores the brake valve handle 18a to its normal or brake release position in which fluid under pressure is vented from the control pipe 13 and connected brake cylinder 12 to the atmosphere through the exhaust port 19 at the brake valve 18.

If the degree of application of the brakes on the wheel unit 11 corresponding to the degree of fluid pressure established in the control pipe 13 and brake cylinder 12 is such as to exceed the adhesion between the wheel unit and the rails, a further operation of the equipment occurs which will now be described.

As previously indicated, when the wheel unit 11 slips, the contact members a and b of the relay 28 are actuated to their picked-up or closed position because, while slipping, the wheel unit decelerates rotatively at a rate exceeding a rate of ten miles per hour per second.

The contact member a of relay 28 is effective in its closed position to establish a circuit for energizing the magnet winding 58 of the release magnet valve 16. At the same time, the contact member b of relay 28 is effective in its closed position to establish a circuit for energizing the magnet winding of relay 36.

The circuit for energizing the magnet winding of the release magnet valve 16 extends from one terminal of the battery 35, hereinafter assumed to be the positive terminal, by way of a wire 61 including switch contact member a of pressure switch 40, contact member a of relay 28, and a wire 62 including the magnet winding 58 of the release magnet valve 16, back to the opposite or negative terminal of the battery 35.

The circuit for energizing the winding of relay 36 extends from the positive terminal of the battery 35 by way of the wire 61 including switch contact member a of pressure switch 40, contact member b of relay 28, a wire 63 including the magnet winding of the relay 36, and wire 62 back to the negative terminal of the battery 35.

The contact members a and b of the relay 36 are thus actuated to their picked-up or closed position in response to the energization of the magnet winding of the relay. The contact member a of the relay 36 is effective in its closed position to establish a self-holding circuit for maintaining the magnet winding of the relay 36 energized independently of the contact member b of the relay 28. This circuit extends from the positive terminal of the battery 35 by way of the wire 61 including switch contact member a of pressure switch 40, a branch wire 64, contact member a of relay 36, a wire 65 including back-contact member a of relay 27 now in its closed position, wire 63 including the magnet winding of the relay 36, and wire 62 back to the negative terminal of the battery 35.

Contact member b of the relay 36 is effective in its closed position to establish a circuit for energizing the magnet winding 44 of the cut-off magnet valve 15. This circuit extends from the positive terminal of the battery 35 by way of the wire 61 including switch contact member a of pressure switch 40, a branch wire 66 including contact member b of relay 36, a wire 68 including the magnet winding 44 of the cut-off magnet valve 15, and wire 62 back to the negative terminal of the battery 35.

It will thus be apparent that when the wheel unit 11 begins to slip, the magnet windings of the two magnet valve devices 15 and 16 are substantially simultaneously energized. Accordingly, the valve 42 of the cut-off magnet valve 15 is actuated to its closed position to cut-off the supply of fluid under pressure from the control pipe 13 to the brake cylinder 12 and the valve 56 of the release magnet valve 16 is actuated to unseated position to cause the exhaust of fluid under pressure from the brake cylinder 12 through the exhaust port 55 at a rapid rate.

Due to the rapid reduction of the pressure in the brake cylinder 12 effected substantially at the instant the wheel unit 11 begins to slip, the wheel unit promptly ceases to decelerate and begins to accelerate at a rapid rate back toward a speed corresponding to car speed.

When the condenser discharge current energizing the winding of the relay 28 decreases sufficiently due to the decrease in the rate of deceleration of the slipping wheel unit, the contact members a and b of the relay 28 are restored to their open position. The opening of the contact member b of the relay 28 is without effect because the holding circuit for maintaining the winding of the relay 36 is now established by the contact member a of the relay 36.

The opening of the contact member a of the relay 28 interrupts the circuit for energizing the magnet winding 58 of the release magnet valve 16 and thus the valve 56 is restored to its closed position cutting off the further release of fluid under pressure from the brake cylinder 12.

The magnet winding of the cut-off valve 15 remains energized, however, until the relay 36 is deenergized in the manner presently to be described.

The rate of acceleration of the slipping wheel unit back toward a speed corresponding to vehicle speed equals if not exceeds the maximum rate of deceleration of the slipping wheel unit. Thus, when the rate of acceleration of the wheel unit 11 back toward a speed corresponding to car speed exceeds a rate of ten miles per hour per second, the contact members a and b of the relay 27 are actuated to their picked-up position. Contact member a of relay 27 is effective in its picked-up position to open the holding circuit for the winding of the relay 36 and the contact members of the relay 36 are accordingly restored to their open position. The magnet winding 44 of the cut-off magnet valve 15 is, however, not deenergized because contact member b of the relay 27 establishes a circuit for energizing the magnet winding 44 independently of the opening of the contact member b of the relay 36. This circuit extends from the positive terminal of the battery 35 by way of the wire 61 including switch contact member a of pressure switch 40, a branch wire 69, contact member b of the relay 27, wire 68 including the magnet winding 44 of the magnet valve 15, and wire 62 back to the negative terminal of the battery 35.

When the condenser charging current energizing the operating winding of the relay 27 reduces sufficiently due to the diminution in the rate of acceleration of the slipping wheel unit as it approaches a speed corresponding to car speed, the contact members a and b of the relay 27 are restored to the normal positions thereof. With the contact member a of the relay 36 in its open position, the restoration of contact member a of the relay 27 to its closed position is without effect. The restoration of the contact member b of the relay 27 to its open position interrupts the circuit for energizing the magnet winding 44 of the magnet valve 15 and valve 42 is accordingly unseated to restore the communication between the control pipe 13 and the brake cylinder 12.

Substantially at the time that the slipping wheel unit is restored to a speed corresponding to car speed, therefore, the cut-off magnet valve 15 is operated to restore communication between the control pipe 13 and the brake cylinder 12, and fluid under pressure is accordingly resupplied to the brake cylinder 12 to effect reapplication of the brakes on the wheel unit 11.

As previously indicated, if the pressure in the control pipe 13 tends to reduce from a pressure corresponding to the position of the brake valve handle 18a, the self-lapping valve mechanism of the brake valve 18 automatically operates to maintain a pressure in the control pipe 13 corresponding to the position of the brake valve handle 18a. Accordingly, upon the restoration of the communication between the control pipe 13 and the brake cylinder 12 as just described, the flow of fluid under pressure to the brake cylinder 12 tending to reduce the pressure in the control pipe 13 causes the self-lapping valve mechanism of the brake valve 18 to operate to supply fluid under pressure to the control pipe 13 to maintain a pressure therein corresponding to the position of the brake valve handle. Thus, if the position of the brake valve handle 18a is not changed, the pressure restored in the brake cylinder 12 will correspond to the pressure originally established in the control pipe 13.

If the slipping of the wheel unit 11 was due to momentary low adhesion between the wheel unit and the rails, the restoration of the original pressure in the brake cylinder 12 will not necessarily be effective to cause the wheel unit to again slip. If the low adhesion condition was not momentary but continuous, the reapplication of the brakes to the original degree may again cause the wheel to slip. In such case, the above operation of the magnet valves 15 and 16 under the control of the relays 27, 28 and 36 will be repeated.

Thus, whenever the wheel unit 11 begins to slip, fluid under pressure is instantly and rapidly vented from the brake cylinder 12 to cause the wheel unit to be restored to car speed without reducing to a locked condition and sliding. Furthermore, although the reduction of brake cylinder pressure is terminated before the slipping wheel unit begins to accelerate, reapplication of the brakes is not effected until the slipping wheel unit is restored substantially to a speed corresponding to car speed.

As the speed of the car reduces, the operator customarily effects a reduction in the degree of application of the brakes. Thus, in the present instance, the operator will shift the brake valve handle 18a back toward its normal operating position to reduce the pressure in the control pipe 13 as the car approaches a stop. The pressure in the brake cylinder 12 will thus be correspondingly reduced in the manner previously described, by venting of fluid under pressure through the exhaust port 19 at the brake valve 18 and the likelihood of the wheel unit 11 slipping as the car approaches a complete stop will be minimized.

Obviously, whenever a car attains a complete stop after an application of the brakes, the relays 27 and 28 are both deenergized, as is the relay 36. Thus, the magnet windings of the magnet valves 15 and 16 are always deenergized when a car comes to a stop and the established fluid pressure is always maintained in the brake cylinder to maintain the application of the brakes while the car is stopped. Accordingly with the magnet windings of the magnet valves 15 and 16 deenergized and the magnet valves respectively in open and closed positions, the operator may increase the pressure in the control pipe 13 and connected brake cylinder 12 as desired to effect an adequate degree of application of the brakes to hold the car against creepage on a grade.

To effect a release of the brakes prior to again starting the car, the operator merely restores the brake valve handle 18a to its normal release position and fluid under pressure is thus vented from the brake cylinder 12 and the control pipe 13 through the exhaust port 19 at the brake valve 18 to effect a complete release of the brakes. When the pressure in control pipe 13 reduces below five pounds per square inch, switch contact member a of pressure switch 40 is snapped back to its open position, thus insuring deenergization of all circuits.

It will be apparent that the equipment shown is adapted for only one direction of travel of the car. This is so because when the direction of the travel of the car is reversed, the polarity at the brush terminals 23 and 24 of the generator 22 associated with the wheel unit 11 is likewise reversed, and relays 27 and 28 would thus operate in reverse order to that previously described.

Figure 2:
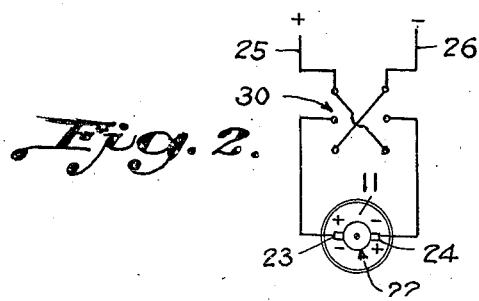

If it is desired to adapt the equipment for travel of the car in either direction, it is necessary to provide a reversing switch 30 to reverse the connections of the wires 25 and 26 to the brush terminals 23 and 24 of the generator 22, as shown in Fig. 2. Such a reversing switch mechanism may be either of a manual type or an automatic type as shown in the copending application, Serial No. 297,103, of Andrew J. Sorensen, filed September 29, 1939 and assigned to the assignee of this application.

For simplicity, I have illustrated my invention in connection with single wheel or wheel unit 11. It will be understood, however, that in the application of my invention to a complete car equipment, suitable modifications will be necessary which should be readily apparent to those skilled in the art.

For example, the equipment shown may be duplicated for each wheel or wheel unit on the car; or, if desired, a set of magnet valves 15 and 16 may be provided for controlling one or more brake cylinders of each car truck and each wheel unit of the truck may be provided with a generator circuit including two relays 27 and 28 and a condenser as shown, the contact members of the corresponding relays being arranged for parallel operation, except for the contact members a of the two relays 27. In the case of the contact members a of the two relays 27, an additional front contact member must be provided on the relay 36 so that contact member $a$ of each relay 27 has its own independent holding circuit for the winding of the relay 36.

Summary

Summarizing, it will be seen that I have disclosed a brake control equipment for vehicles, such as railway cars or trains, including a novel apparatus for effecting a rapid reduction in the degree of application of the brakes associated with a wheel or wheel unit at the instant it begins to slip, for terminating the reduction in the degree of application of the brakes when the slipping wheel ceases to decelerate at a rate exceeding a certain low rate and effecting reapplication of the brakes on the wheel which slipped substantially at the time the slipping wheel returns to a speed corresponding to car speed.

It is important to note that the arrangement that I have provided is such as to terminate the reduction in the degree of application of the brakes initiated in response to slipping of a car wheel substantially at the time the slipping wheel ceases to decelerate at a rate exceeding a certain low rate whereas the reapplication of the brakes is not initiated until the slipping wheel is restored substantially to a speed corresponding to car speed. By this arrangement, only so much of a reduction in the degree of application of the brakes is effected as is required to cause the slipping wheel to accelerate toward a speed corresponding to car speed. Furthermore, due to the fact that the reapplication of the brakes on the wheel is not effected until it returns substantially to a speed corresponding to car speed, the likelihood that the wheel will decelerate to a locked or non-rotative condition upon reapplication of the brakes is minimized.

While I have disclosed only simplified embodiments of my invention, various omissions, additions or modifications may be made therein without departing from the spirit of my invention. I do not desire, therefore, to limit the scope of my invention except in accordance with the terms of the appended claims.

Having now described my invention, what I claim as new and desire to secure by Letters Patent, is:

1. In a vehicle wheel brake control apparatus of the type having manually controlled means for effecting application and release of the brakes associated with all the wheel units on the vehicle, the combination of valve means normally conditioned to permit the control of the degree of the application of the brakes by said manually controlled means and operative during an application of the brakes to effect a rapid reduction in the degree of application of the brakes associated with an individual wheel unit and subsequently an increase in the degree of application thereof, means operatively responsive according to the rate of rotative deceleration of the said individual wheel unit, means operatively responsive according to the rate of rotative acceleration of the individual wheel unit, said deceleration responsive means and said acceleration responsive means being effective to so control said valve means as to cause the valve means to initiate a rapid reduction in the degree of application of the brakes when the rate of rotative deceleration of the individual wheel unit exceeds a certain rate occurring only when the wheel unit slips, to terminate the reduction in the degree of application of the brakes when the rate of rotative deceleration of the individual wheel unit reduces below a second certain rate lower than the first said certain rate, and to initiate an increase in the degree of application of the brakes only after the rate of acceleration of the slipping wheel unit reduces below a certain rate.

2. In a vehicle wheel brake apparatus of the type having a brake cylinder and a pipe through which fluid under pressure is supplied to and released from the brake cylinder to effect application and release of the brakes associated with an individual wheel unit, the combination of a cut-off valve device normally effective to establish communication through said pipe and effective upon operation to close communication through said pipe, a release valve device operative to effect a rapid reduction of the fluid pressure in the brake cylinder, means operatively responsive according to the rate of rotative deceleration of the individual wheel unit, means operatively responsive according to the rate of rotative acceleration of the individual wheel unit, said deceleration responsive means being effective upon the rotative deceleration of the individual wheel unit at a rate in excess of a certain rate occurring only when the wheel unit slips for effecting substantially simultaneous operation of said cut-off valve device and said release valve device whereby to effect the rapid reduction of the pressure in the brake cylinder, and operative when the rate of rotative deceleration of the slipping wheel unit reduces below a second certain rate lower than the first said certain rate for causing operation of said release valve device to terminate the reduction of the pressure in the brake cylinder, said acceleration responsive means being effective, once the cut-off valve device is operated, to maintain it in its operated position preventing the supply of fluid under pressure to the brake cylinder until the rate of rotative acceleration of the slipping wheel as it returns back toward a speed corresponding to vehicle speed reduces below a certain rate.

3. In a vehicle wheel brake control apparatus of the type having manually controlled means for effecting application and release of the brakes associated with a wheel unit of the vehicle, the combination of a first electrical relay, a second electrical relay, means adapted to cause pick-up of said first relay only when the rate of rotative deceleration of the said wheel unit exceeds a certain rate occurring only when the wheel unit slips and adapted to cause the relay to drop out only after the rate of rotative deceleration of the wheel unit reduces below a second certain rate lower than the first said certain rate, means adapted to cause pick-up of the said second relay only when the rate of rotative acceleration of the said wheel unit exceeds a certain rate occurring only when the wheel unit accelerates back toward a speed corresponding to vehicle speed while slipping and to cause the relay to drop out only after the rate of rotative acceleration of the wheel unit reduces below a second certain rate lower than the first said certain rate of acceleration, and means controlled by said first and said second relay in such a manner as to effect a rapid reduction in the degree of application of the brakes when the said first relay is picked-up, termination of the reduction in the degree of application when the said first relay is dropped-out, and initiation of an increase in the degree of application of the brakes when the said second relay is dropped-out.

4. In a vehicle wheel brake control apparatus of the type having manually controlled means for effecting application and release of the brakes associated with an individual wheel unit of the vehicle, the combination of an electrical circuit, a first relay and a second relay having the operating windings thereof connected in parallel relation in said circuit, means for causing a flow of current in one direction in said circuit substantially proportional to the rate of rotative deceleration of the individual wheel unit and a flow of current in said circuit in the opposite direction substantially proportional to the rate of rotative acceleration of the wheel unit, means preventing the flow of current through the operating winding of said first relay except when the current flows in said circuit in said one direction, means preventing flow of current through the operating winding of the said second rely except when the current flows in the said circuit in said opposite direction, said first relay being picked-up in response to a current exceeding a certain value and corresponding to a rate of rotative deceleration of the wheel unit exceeding a certain value occurring only when the wheel unit slips and dropped-out only after the current reduces below a second certain value corresponding to a rate of rotative deceleration of the wheel unit lower than the first said certain value, said second relay being picked-up in response to a current exceeding a certain value corresponding to a rate of rotative acceleration of the wheel unit occurring only when the wheel unit accelerates back toward a speed corresponding to vehicle speed while slipping and dropped-out only after the current reduces below a second certain value corresponding to a rate of rotative acceleration of the wheel unit lower than the first said certain value, and means operative in response to the pick-up of the said first relay to effect a rapid reduction in the degree of application of the brakes, operative in response to the drop-out of said first relay to terminate the reduction in the degree of application of the brakes and operative when the said second relay is dropped-out for initiating an increase in the degree of application of the brakes.

5. In a vehicle wheel brake control apparatus of the type having manually controlled means for effecting application and release of the brakes associated with a wheel unit of the vehicle, the combination of an electrical circuit, a first relay and a second relay, both of the neutral type, having the operating windings thereof connected in parallel relation in said circuit, means adapted to cause a flow of current in said circuit in one direction substantially proportional to the rate of rotative deceleration of said wheel unit and also a flow of current in said circuit in the opposite direction substantially proportional to the rate of rotative acceleration of the wheel unit, a uni-directional valve device of the electrical type adapted to prevent the flow of current through the operating winding of the said first relay except when the current flows in said one direction in said circuit, a second uni-directional valve device of the electrical type adapted to prevent the flow of current through the operating winding of said second relay except when the current flows in said circuit in said opposite direction, said first relay being picked-up in response to a current exceeding a certain value corresponding to a certain rate of rotative deceleration of the wheel unit occurring only when the wheel unit slips and dropped-out only when the current reduces below a value corresponding to a certain rate of rotative deceleration of the wheel unit lower than the first said certain rate, said second relay being picked-up only in response to a current exceeding a certain value corresponding to a certain rate of rotative acceleration of the wheel unit and dropped-out only when the current reduces below a certain value corresponding to a second certain rate of rotative acceleration lower than the first said certain rate, and means effective when said first relay is picked-up to initiate a rapid reduction in the degree of application of the brakes, effective when said first relay is dropped-out to terminate the reduction in the degree of application of the brakes, and effective when said second relay is dropped-out to initiate an increase in the degree of application of the brakes.

6. In a vehicle wheel brake control apparatus of the type having manually controlled means for effecting application and release of the brakes associated with a wheel unit of the vehicle, the combination of means adapted to produce an electrical effect substantially proportional in degree to the rate of rotative deceleration of the wheel unit and an electrical effect substantially proportional to the rate of rotative acceleration of the wheel unit, means operatively responsive to an electrical effect produced during deceleration of the wheel unit and exceeding a certain value occurring only when the wheel unit slips for initiating a rapid reduction in the degree of application of the brakes associated with the wheel unit and effective when the electrical effect produced during deceleration of the wheel unit reduces below a second certain value lower than the first said certain value for terminating the reduction in the degree of application of the brakes, and means responsive to the electrical effect produced during acceleration of the wheel unit for initiating an increase in the degree of application of the brakes only after the electrical effect reduces below a certain degree corresponding to a certain low rate of acceleration of the wheel unit.

JOSEPH C. McCUNE.